United States Patent
Bergmann et al.

[11] Patent Number: 6,125,221
[45] Date of Patent: Sep. 26, 2000

[54] THREE PORT OPTICAL FILTER

[75] Inventors: Ernest Eisenhardt Bergmann, Lehigh County; Kevin Cyrus Robinson, Upper Milford Township, Lehigh County, both of Pa.; Neal Henry Thorsten, Lebanon, N.J.

[73] Assignee: Lucent Technologies, Inc., Murray Hill, N.J.

[21] Appl. No.: 09/044,505

[22] Filed: Mar. 19, 1998

[51] Int. Cl.[7] .................................................. G02B 6/32
[52] U.S. Cl. .............................. 385/33; 385/24; 359/131
[58] Field of Search .............................. 385/33, 15, 24, 385/27, 39; 359/131, 127

[56] References Cited

U.S. PATENT DOCUMENTS

| | | | |
|---|---|---|---|
| 4,244,045 | 1/1981 | Nosu et al. | 370/3 |
| 5,629,995 | 5/1997 | Duck et al. | 385/24 |
| 5,652,814 | 7/1997 | Pan et al. | 385/24 |
| 5,680,237 | 10/1997 | Cheng | 359/131 |
| 5,737,104 | 4/1998 | Lee et al. | 359/124 |
| 5,790,314 | 8/1998 | Duck et al. | 359/654 |

*Primary Examiner*—John D. Lee
*Assistant Examiner*—Victoria D. Hao

[57] ABSTRACT

A three port filter device is formed from a thin film filter element and a pair of lensing devices. A focusing lensing device is used, with a dual-fiber termination disposed at the object plane of the focusing lensing device. A collimating lensing device is disposed between the focusing lens image plane and the thin film filter element. The third optical port is coupled to the collimated signal passing through the filter element. The focusing lens may be moved along the optical axis to modify the spacing of the dual-fiber termination image appearing at the image plane. The change in spacing results in changing the angle of incidence of the optical signal propagating toward the thin film optical element. Since the pass wavelength of the thin film element is a function of the angle of incidence, the movement of the focusing lens may be used to "tune" the pass wavelength of the thin film optical device.

13 Claims, 5 Drawing Sheets

THREE PORT OPTICAL FILTER

BACKGROUND OF THE INVENTION

1. Technical Field

The present invention relates to a three port optical filter device and, more particularly, to an optical filter utilizing a bulk filter element and a lensing arrangement to provide for adjustments in the filter characteristics.

2. Description of the Prior Art

It is well-known that thin-film bulk optic elements may be used as a filter device in optical communication systems. The orientation of the bulk optic element with respect to the light ray passing therethrough defines the wavelengths that are either reflected or refracted by the bulk optic element. Depending upon the materials used to form the film layers and the thicknesses of the various layers, a variety of different filter elements can be formed (i.e., bandpass, short wavelength pass, or long wavelength pass). A conventional two-port filter device may be formed that will pass any particular wavelength. A multiple wavelength system may be formed by combining, in parallel, a number of separate single wavelength filter devices. A three-port filter device may be formed by using a third waveguide to receive any signal reflected by the filter element. A problem with conventional three-port filter device designs is that any tilt of the filter element (often necessary to provide a "fine" adjustment of the filter's "pass" wavelength) results in changing the direction of the reflected signal such that the reflected signal may not be readily captured by the third waveguide.

SUMMARY OF THE INVENTION

The present invention relates to a three port optical filter and, more particularly, to an optical filter device utilizing a bulk filter device and a lensing arrangement to adjust the filter pass wavelength without requiring the filter element itself to be tilted.

In accordance with the present invention, a pair of lensing devices are disposed between a dual-fiber termination and a conventional bulk optic device filtering element. The terminations of the pair of fibers define the object plane of the filtering arrangement. A first lensing device (which may comprise one or more separate lenses, or a compound lens arrangement) is used to focus the fiber outputs onto the image plane of the filter system, where with proper lensing a 1-to-1 imaging of the terminations may optionally be obtained. A second lensing device is positioned between the image plane and the filter element and is used to collimate the optical signals passing therethrough. The movement of the first lensing device along the optical axis functions to either magnify or reduce the fiber termination images, thus allowing for the spacing to be adjusted as the filter element is moved. The spacing adjustment results in modifying the angle of incidence of the optical signal upon the filter element, where the angle of incidence determines the wavelength that is passed by the filter. The arrangement of the present invention therefore allows for the filter element to be "tuned" without tilting the filter element and changing the direction of the reflected signal. The second lensing device may also be moved to obtain the optimum collimation of the signal.

A number of such filtering device may be coupled together to form a multiple wavelength three-port filter sub-system.

An aspect of the present invention is that the arrangement may be used as either a demultiplexer (i.e., separating the various wavelengths as they pass through the filter devices), or as a multiplexer (i.e., combining the various wavelengths as they pass through the filter devices), since the optical devices are all reciprocal in nature.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
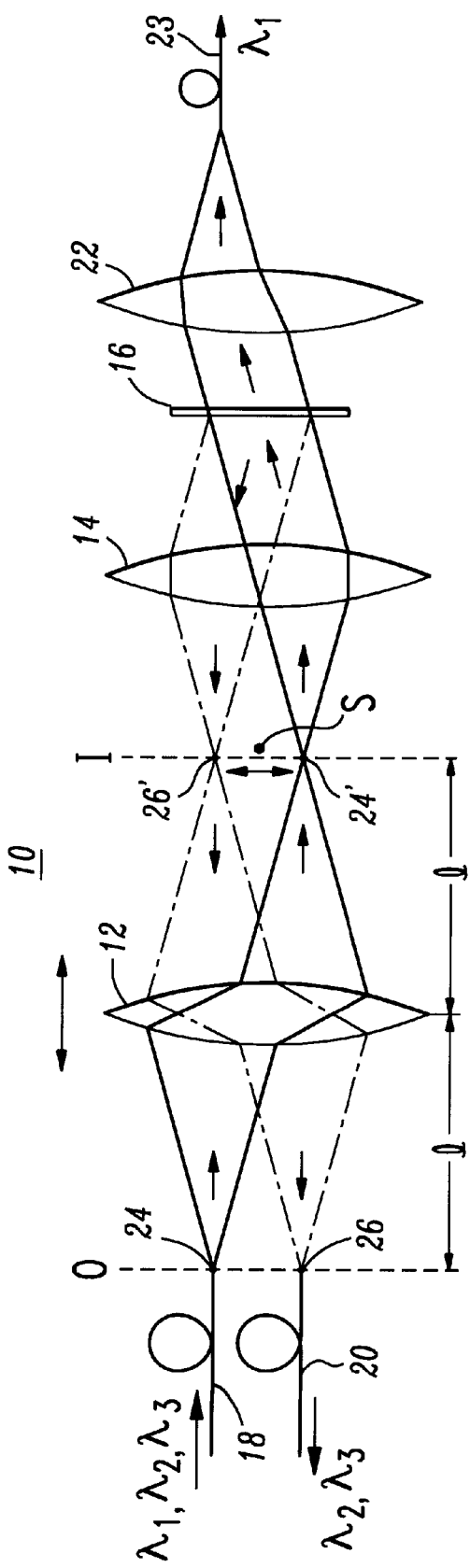
FIG. 1 illustrates an exemplary three-port filter device formed in accordance with the present invention, illustrating in particular the use of the three-port filter device as a demultiplexer.

An exemplary three-port filter device 10 is illustrated in FIG. 1. Throughout the following discussion, the operation of the inventive filter element will be described in terms of "passing" a particular wavelength and "reflecting" one or more other wavelengths. It is to be understood, as will be discussed below in association with FIG. 3, that a particular thin film filter device as used in accordance with the present invention may also be designed to pass multiple wavelengths (that is, the thin film element may be designed as a bandpass filter capable of passing all wavelengths in a predetermined range). The arrangement of the present invention may be so designed and, therefore, the designation of any particular wavelength, such as $\lambda_1$, is considered to define either a specific wavelength (such as 980 nm), or a range of wavelengths (such as 1060–1200 mn, for example).

Figure 5:
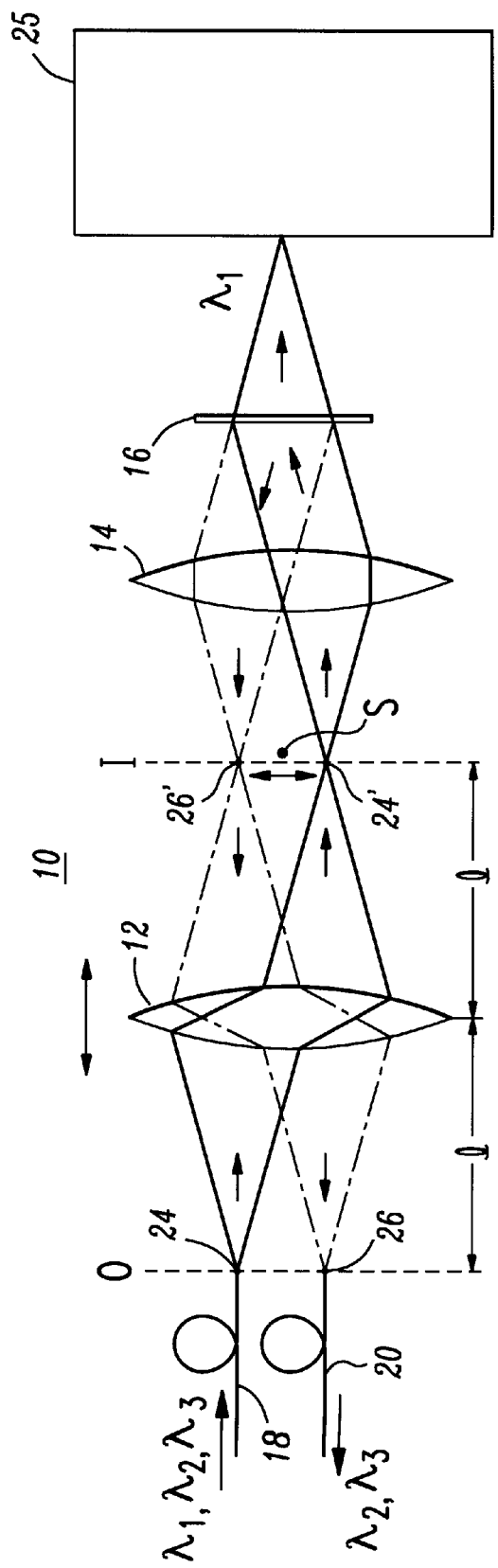
FIG. 5 illustrates the exemplary three-port filter device of FIG. 1 directly coupled to a photodetector, instead of the optical fiber assembly as shown in FIG. 1.

Referring to FIG. 1, filter device 10 comprises a focusing lensing device 12, a collimating lensing device 14 and a thin film filter element 16. A pair of optical fibers 18, 20 form a first dual-fiber termination and are disposed to couple light into and out of focusing lensing device 12. In most conventional arrangements, optical fibers 18 and 20 are affixed within a single unit, such as a ferrule, where the intra-fiber spacing is fixed and cannot be adjusted (i.e., cannot compensate for changes in tilt of a film filter element). A detection arrangement, in the illustrated embodiment comprising a third lensing device 22 and a third optical fiber 23, is disposed beyond thin film filter element 16 and is used to capture the filtered optical signal passing therethrough. An alternative detection arrangement may simply comprise a photodetector. FIG. 5 illustrates an alternative embodiment of three-port filter device 10 wherein a photodetector 25 is directly coupled to receive the output signal passing through thin film filter element 16. In general, any suitable optical receiving system may be used and is considered to fall within the spirit and scope of the present invention.

Referring back to FIG. 1, the terminations of fibers 18 and 20, denoted 24 and 26, respectively, are positioned at the object plane of focusing lens 12. The object plane is indicated by the dashed vertical line designated "O" in FIG. 1. Lensing device 12 is chosen so as to provide a nominal 1-to-1 imaging of terminations 24 and 26 (noted in inverted form as 24' and 26') along the image plane, designated by the dashed vertical line "I" in FIG. 1.

In operation as a demultiplexer, fiber 18 may be defined as the "input" fiber carrying a plurality of signals at different wavelengths. For the purposes of the present discussion, it will be presumed that three signals, operating at $\lambda_1$, $\lambda_2$, and $\lambda_3$ are propagating along fiber 18 and exit at termination 24. The three signals subsequently pass through focusing lensing device 12 and are focused at point 24' at image plane I. The signals then impinge lensing device 14. Lensing device 14 functions in a manner similar to other lenses in conventional filter designs. That is, lensing device 14 collimates the three signals and provides a collimated beam input to filter element 16. Thin film filter element 16 is a conventional thin film filter, designed to pass a predetermined wavelength and reflect all others. For the purposes of the present discussion, it is presumed that the signal propagating at $\lambda_1$ will pass through filter element 16 (and remain collimated), while the signals propagating at $\lambda_2$ and $\lambda_3$ (also remaining collimated) will be reflected. The reflected wavelengths then pass again through lens 14, this time focusing at point 26' along image plane I. The reflected waves then pass through focusing lens 12 so as to be focused onto termination 26 of fiber 20.

In accordance with the principles of the present invention, lensing device 12 may be moved to the right or left, as shown by the double-ended arrow, where this movement will result in modifying the separation, S, between image points 24' and 26'. This separation results in changing the angle of incidence of the incoming beam impinging thin film filter 16. It is well-known that the angle of incidence of an optical beam onto a thin film filter element controls the characteristics of the filter (that is, the angle of incidence is a factor in determining the particular wavelengths that are either passed or reflected). Therefore, filter device 10 of the present invention may be "tuned"(i.e., the particular wavelength that is passed or reflected may be adjusted) by moving focusing lensing device 12 and changing the separation S between the images. In particular, moving lensing device 12 to the left will increase the separation S, increasing the angle of incidence, and shortening the wavelength response of filter element 16. On the other had, moving lens 12 to the right will decrease the separation S, decrease the angle of incidence and lengthen the wavelength response of filter element 16. This process is in contrast to the prior art which required that filter element 16 being physically tilted to change the characteristic wavelength.

Figure 2:
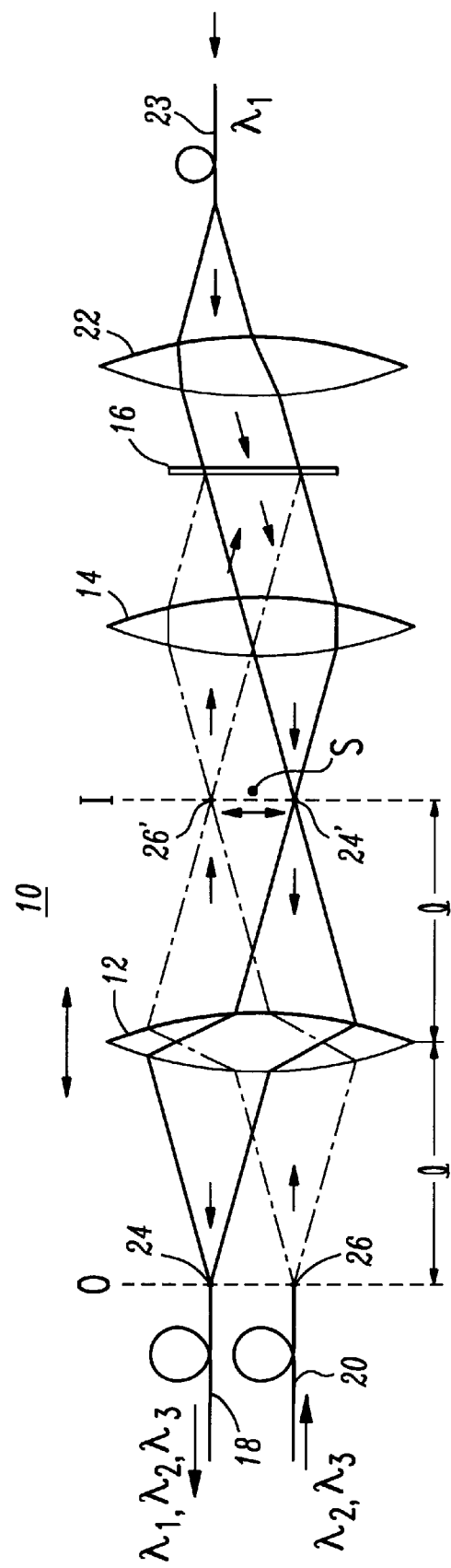
FIG. 2 illustrates the same three-port filter device as shown in FIG. 1, with the signal directions reversed, showing the utilization of the three-port filter device as a multiplexer

The three-port filter element as illustrated in FIG. 1 may also be used as a multiplexer, that is, to combine the three separate wavelengths $\lambda_1$, $\lambda_2$, and $\lambda_3$ onto a single fiber. In this case, fibers 20 and 23 are the "input" fibers and filter device 10 flucions to combine all three wavelengths onto "output" fiber 18. FIG. 2 illustrates the utilization of filter device 10 as a multiplexer. As shown, a first input signal $\lambda_1$ is coupled into first fiber 23 and propagates (in the reverse direction—that is, from right to left) through device 10 so as to be coupled into "output" fiber 18. Similarly, $\lambda_2$ and $\lambda_3$ are coupled into fiber 20 and propagate (in the forward direction) through device 10 until reflected by thin film filter 16. Thereafter, input signals $\lambda_2$ and $\lambda_3$ propagate in the reverse direction through device 10 and are also coupled into "output" fiber 18. As shown in FIG. 2, the multiplexed output signal comprising $\lambda_1$, $\lambda_2$, and $\lambda_3$ exits device 10 along output fiber 18.

Figure 3:
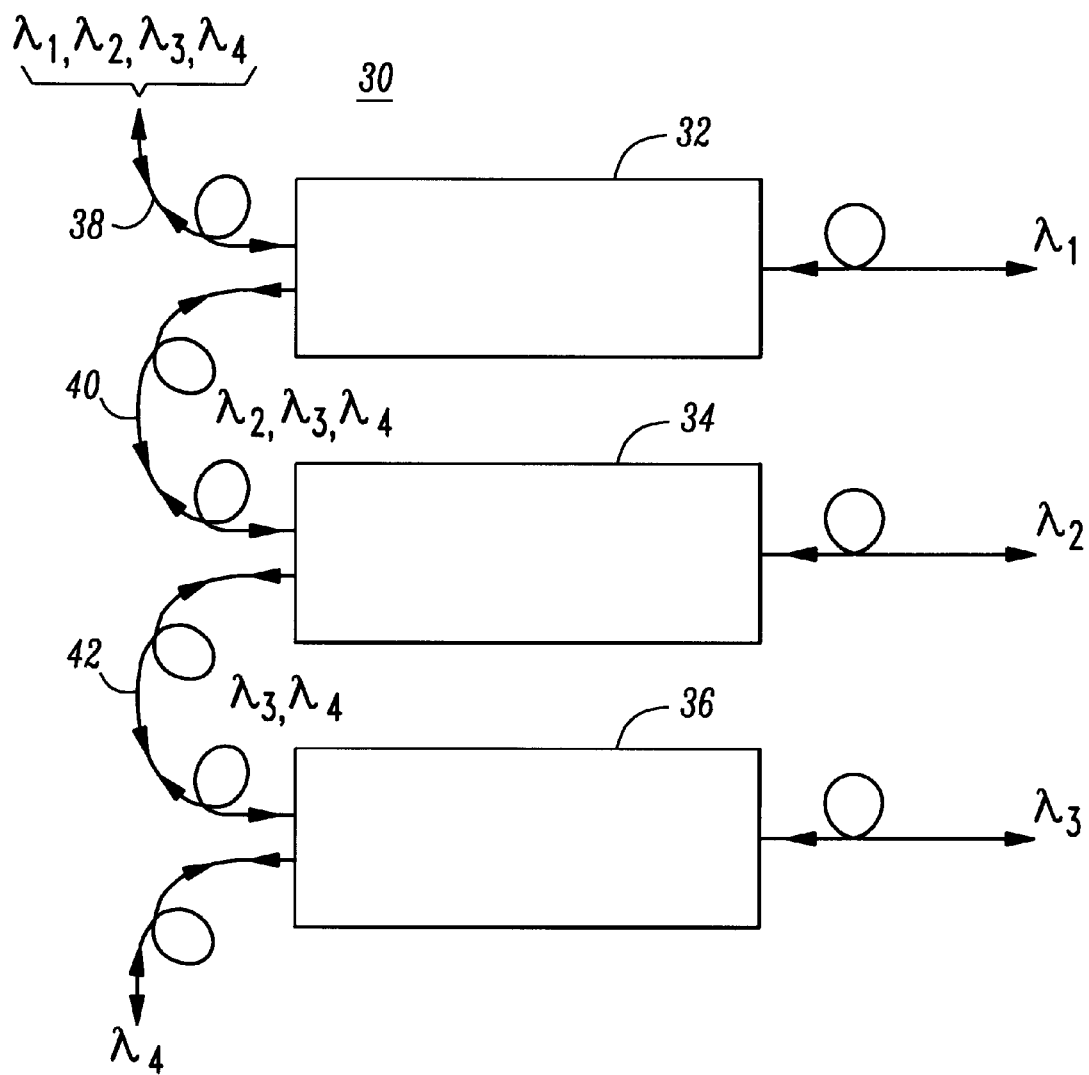
FIG. 3 illustrates an exemplary multiple wavelength multiplexer/demultiplexer sub-system (a cascaded sub-system arrangement) formed in accordance with the present invention.

An exemplary filtering sub-system 30 utilizing a plurality of filtering devices of the present invention is illustrated in FIG. 3. System 30 includes three separate tunable filter devices 32, 34 and 36. An input fiber 38 has a plurality of separate signals propagating therealong, as shown in FIG. 3, and is used as the input to first filter 32. As will be discussed below, first filter device 32 is designed to pass the signal propagating at wavelength $\lambda_1$ and reflect all others. The reflected signals pass a second time through the left hand side of first filter device 32 (as with the arrangement of FIG. 1) and are coupled into a second fiber 40. Second fiber 40 is then used as the input fiber to second filter device 34, where second filter device 34 is designed to pass the signal propagating at $\lambda_2$ and reflect all others. The reflected waves then propagate back through second filter device 34 and into a third fiber 42, where third fiber 42 is used as the input fiber to third filter device 36. As shown in FIG. 3, third filter device 36 is designed to pass the signal propagating at wavelength $\lambda_3$ and pass all others. In this case, the remaining signal is that propagating at wavelength $\lambda_4$. It is to be understood that the above-described system is exemplary only. There exist numerous variations of multiplexer/demultiplexer designs that may utilize the tunable filtering devices of the present invention.

Figure 4:
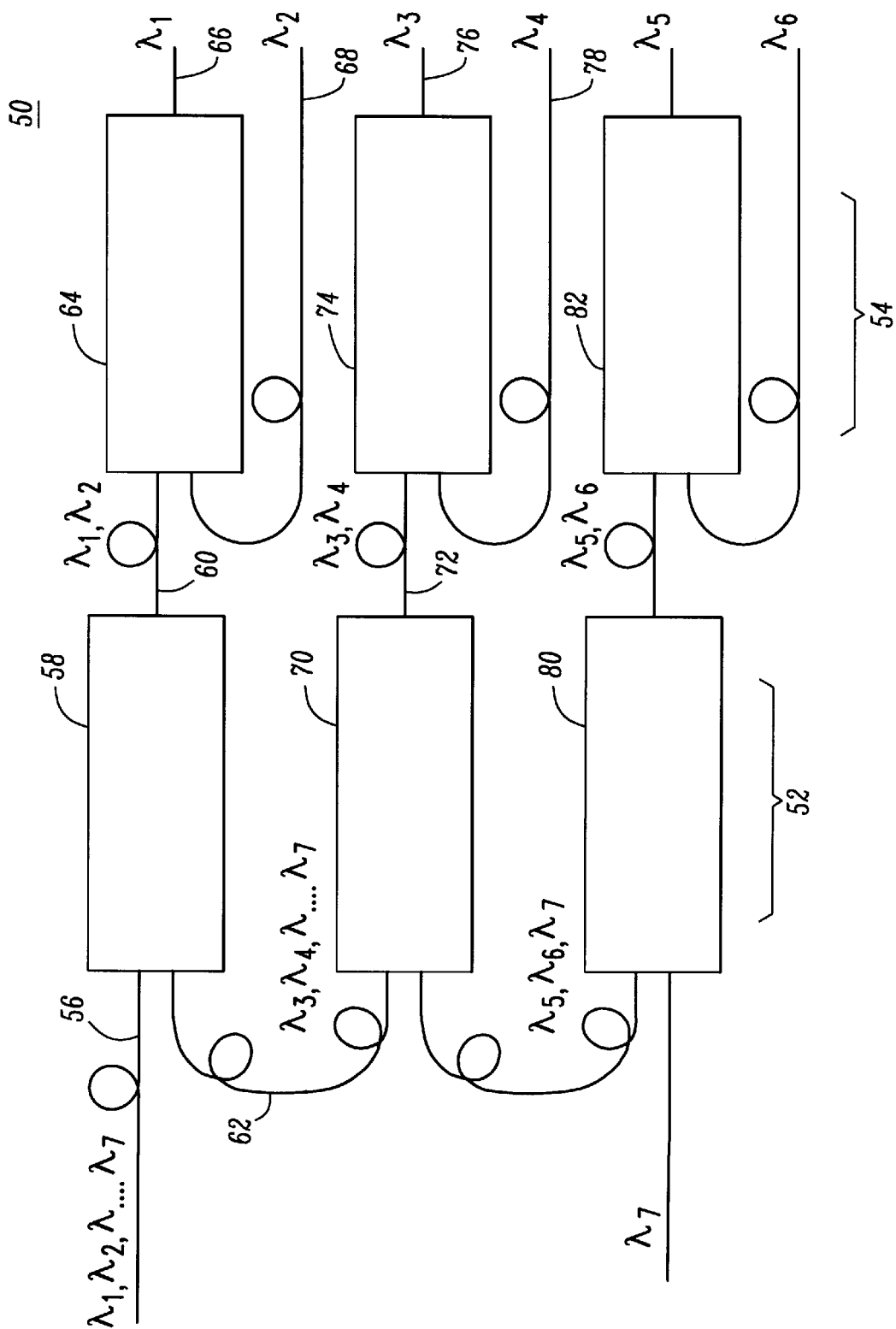
FIG. 4 is an alternative multiple wavelength multiplexer/demultiplexer subsystem (a "tree structure" sub-system arrangement) of the present invention.

For example, a "tree structure" filter sub-system may be formed, one exemplary arrangement being illustrated in FIG. 4. As shown, sub-system 50 of FIG. 4 contains two levels of filtering, designated 52 and 54. In general, multiple levels of filtering are possible. The operation of sub-system 50 as a demultiplexer will be briefly discussed. It is to be understood that sub-system 50, as a result of its reciprocal nature, may also function as a multiplexer. As shown, a first input fiber 56 carries a plurality of signals, denoted as $\lambda_1$, $\lambda_2$, ... $\lambda_7$ that are applied as the input to a first three-port filter device 58. The thin film filter element within device 58 (not shown) is configured to "pass" both wavelengths $\lambda_1$ and $\lambda_2$, reflecting all others. Therefore, the signals at $\lambda_1$ and $\lambda_2$ will pass to the third port of device 58 and be coupled to output fiber 60. The remaining wavelengths ($\lambda_3$–$\lambda_7$) will be reflected back through the left side of device 58 and be coupled into a second fiber 62, where fibers 56 and 62 form a dual fiber termination as discussed above. Wavelengths $\lambda_1$ and $\lambda_2$ are then applied as an input to a three-port filtering device 64, where device 64 is designed, in this particular embodiment, to pass wavelength $\lambda_1$ and reflect wavelength $\lambda_2$. Therefore, wavelength $\lambda_1$ is coupled to an output fiber 66 and wavelength $\lambda_2$ is coupled into a separate output fiber 68. Returning to level 52, the plurality of wavelengths $\lambda_3$–$\lambda_7$ propagating along fiber 62 are subsequently applied as the input to three-port filter device 70, where device 70 is designed to "pass" wavelengths $\lambda_3$ and $\lambda_4$, reflecting all others. Therefore, as shown in FIG. 4, wavelengths $\lambda_3$ and $\lambda_4$ are coupled into an output fiber 72, where fiber 72 is applied as the input to a three-port filter element 74. Filter element 74 functions to demultiplex wavelength $\lambda_3$ from wavelength $\lambda_4$, coupling the signal propagating at wavelength $\lambda_3$ to output fiber 76 and the signal propagating at wavelength $\lambda_4$ to output fiber 78. Three-port filter elements 80 and 82 function in a similar manner to provide the demultiplexing necessary to separate wavelengths $\lambda_5$, $\lambda_6$ and $\lambda_7$. As mentioned above, various other architectures are possible and are considered to fall within the spirit and scope of the present invention.

Each filter device within the embodiments of FIGS. 3 and 4 includes the components as shown in FIG. 1, namely, a focusing lensing device, a collimating lensing device and a thin film filter element. In order to provide the desired wavelength tuning in accordance with the present invention, the focusing lensing device within each filter device is adjusted to control the associated spacing S to allow for the desired wavelength to be passed. In particular, filter device 32 includes a focusing lensing device adjusted to provide a spacing $S_1$ that is proper to provide an angle of incidence on the associated thin film filter such that the signal propagating at $\lambda_1$ is passed, with the remaining wavelengths being reflected. Each filter device is similarly adjusted so that only the desired wavelength is passed.

As with the simple three-port filter device of FIG. 1, the sub-systems of FIG. 3 and FIG. 4 are also bidirectional. That is, the "output" fibers may be viewed as the "input" and the arrangement of the present invention used as a multiplexer for combining the plurality of signals propagating at different wavelengths onto a single output fiber. Additionally, although the embodiments as discussed above utilized optical fibers to carry the individual signals it is to be understood that any suitable type of optical waveguide (for example, lithium niobate-based waveguides) may be used and does not effect the performance of the three-port filter arrangement of the present invention. Further, the illustrated output fibers (and their associated lenses) may be replaced by a photodetector, as shown in FIG. 5. Various other modifications may be made and are considered to fall within the spirit and scope of the present invention as defined by the appended claims. In particular, the filtering device of the present invention can be used with various other types of multiplexers/demultiplexers, such as Dragone routers.

What is claimed is:

1. A multiple-port optical filter comprising
   a thin film filter element comprising an optical axis, the pass wavelength of the filter defined by the angle of incidence, with respect to the optical axis, of an incoming optical signal;
   a focusing lensing device characterized by an object plane and an image plane; and
   a collimating lensing device disposed between the focusing lens image plane and the thin film filter element;
   a pair of optical ports disposed at the object plane of the focusing lens, the optical ports being imaged onto the focusing lens image plane wherein the focusing lens in moved along the optical axis to modify the separation between the optical port images appearing at the image plane and thereby alter the angle of incidence of an optical beam impinging the thin film filter element.

2. A multiple port optical filter as defined in claim 1 wherein the filter further comprises a third optical port disposed beyond the thin film element for coupling an optical signal passing through said thin film filter element.

3. A multiple port optical filter as defined in claim 1 wherein an optical fiber is coupled to each optical port.

4. A multiple port optical filter as defined in claim 1 wherein a photodetector is directly coupled to one port.

5. A multiple wavelength filter subsystem comprising a plurality of three-port filter devices disposed in a predetermined relationship, at least one three-port filter device comprising
   a thin film filter element comprising an optical axis, the pass wavelength of the filter defined by the angle of incidence, with respect to the optical axis, of an incoming optical signal;
   a focusing lens characterized by an object plane and an image plane; and
   a collimating lens disposed between the focusing lens image plane and the thin film filter element;
   a pair of optical ports disposed at the object plane of the focusing lens, the optical ports being imaged onto the focusing lens image plane, wherein the focusing lens is moved along the optical axis to modify the separation between the optical port images appearing at the image plane and thereby adjust the angle of incident of an optical signal impinging the thin film filter element; and
   a third optical port disposed beyond the thin film element for coupling an optical signal passing through said thin film filter element.

6. A multiple wavelength filter subsystem as defined in claim 5 wherein the subsystem comprises a demulitplexer and for each three-port filter, a first optical port of the pair of optical ports is defined as an input port, the remaining port of the pair of optical ports is defined as a reflected port and the third port is defined as an output port.

7. A multiple wavelength filter subsystem as defined in claim 6 wherein the plurality of three-port filters are arranged such that the reflected port of a first filter device is used as the input port for the next filter device.

8. A multiple wavelength filter subsystem as defined in claim 6 wherein the plurality of three-port filters are arranged such that the output port of a first filter device is used as the input port for the next filter device.

9. A multiple wavelength filter subsystem as defined in claim 5 wherein for each three-port filter, a first optical port of the pair of optical ports is defined as a first input port, the third port is defined as a second input port, and the remaining port of the pair of optical ports is defined as the output port.

10. A multiple wavelength filter subsystem as defined in claim 9 wherein the plurality of three-port filter devices are arranged such that the output port of a first filter device is used as the first input port for the next filter device.

11. A multiple wavelength filter subsystem as defined in claim 9 wherein the plurality of three-port filter devices are arranged such that the output port of a first filter device is used as the second input port for the next filter device.

12. A multiple wavelength filter subsystem as defined in claim 5 wherein an optical fiber is coupled to each port.

13. A multiple wavelength filter subsystem as defined in claim 5 wherein a photodetector is coupled to one port of at least one three-port filter device.

* * * * *